March 2, 1954  J. COOK  2,670,988
FOLDING PICKUP TRUCK TOP
Filed Aug. 22, 1950  3 Sheets-Sheet 1
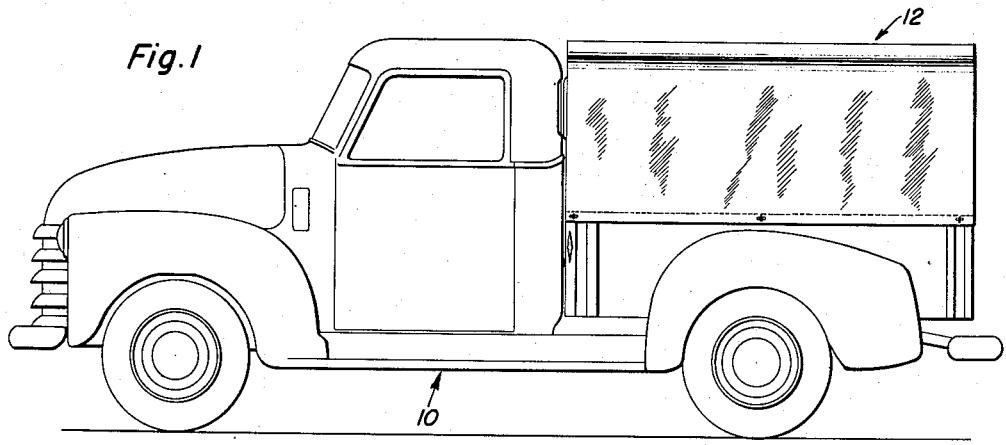
Fig. 1
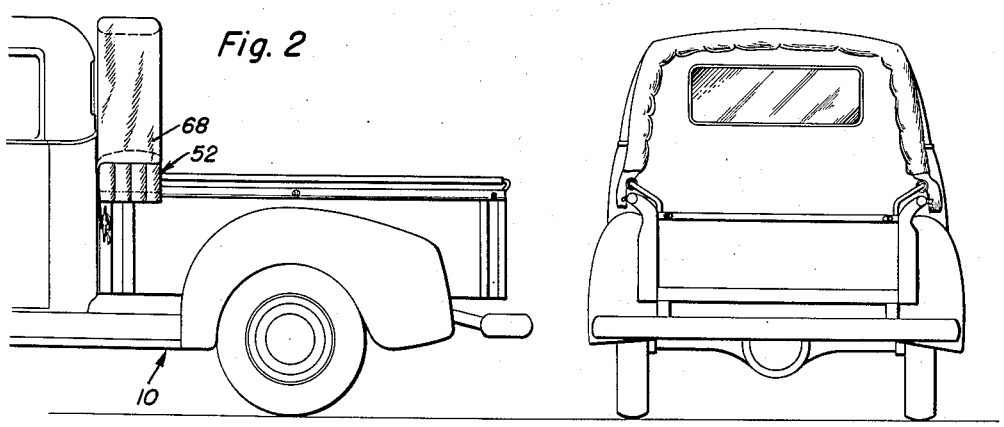
Fig. 2
Fig. 3
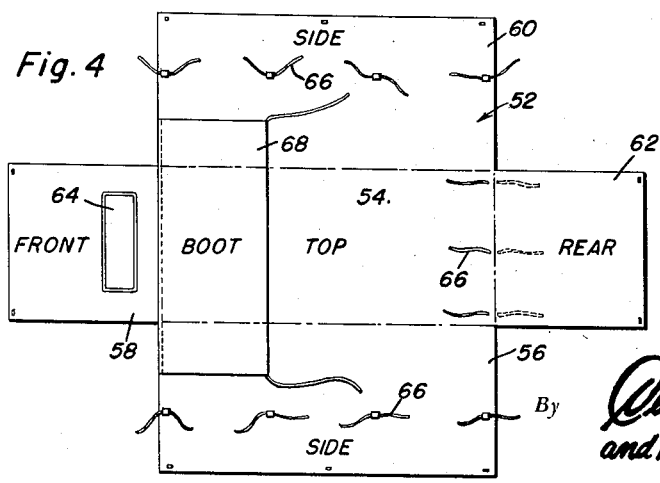
Fig. 4
Inventor
John Cook
By Clarence A. O'Brien
and Harvey B. Jacobson
Attorneys March 2, 1954 J. COOK 2,670,988
FOLDING PICKUP TRUCK TOP
Filed Aug. 22, 1950 3 Sheets-Sheet 2
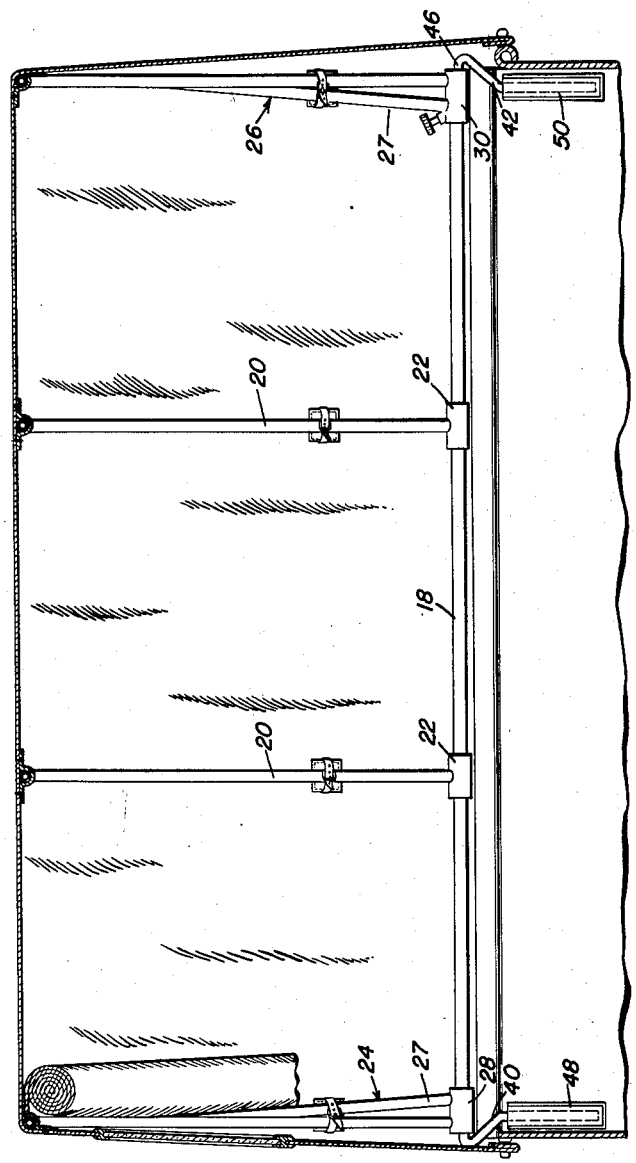
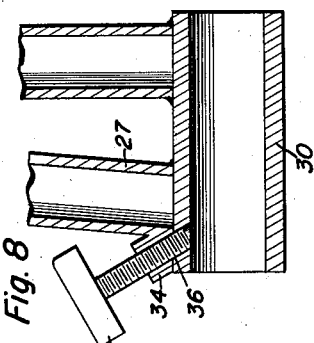
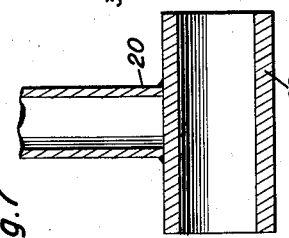
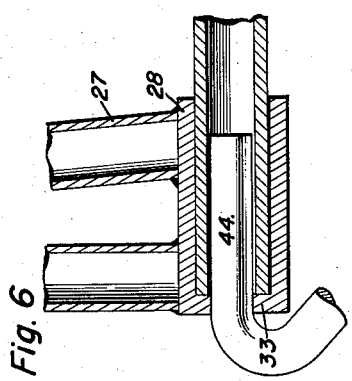
Inventor
John Cook
By *Clarence A. O'Brien and Harvey B. Jacobson*
Attorneys March 2, 1954  J. COOK  2,670,988
FOLDING PICKUP TRUCK TOP
Filed Aug. 22, 1950  3 Sheets-Sheet 3
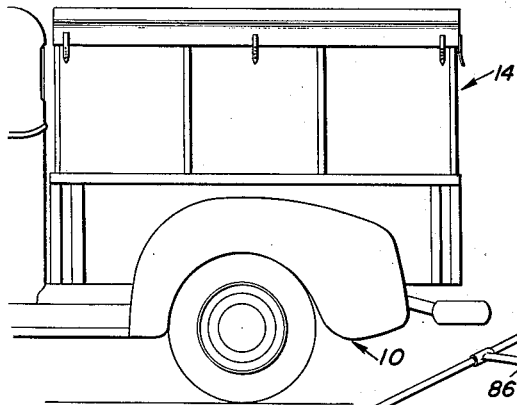
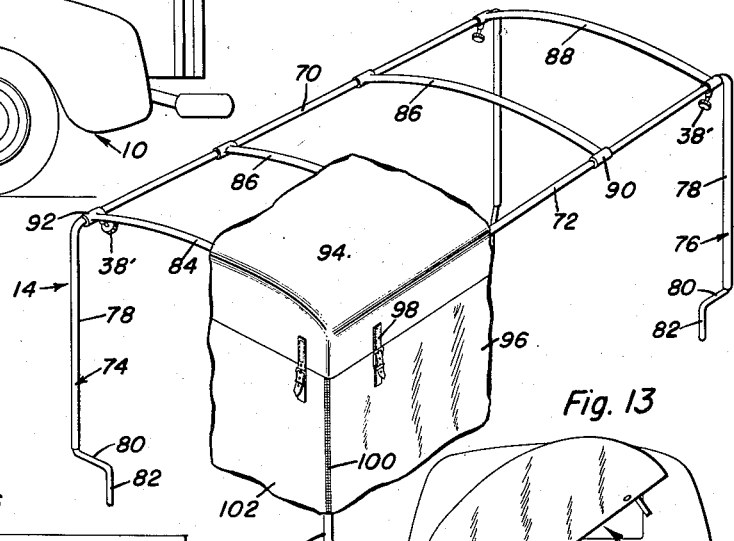
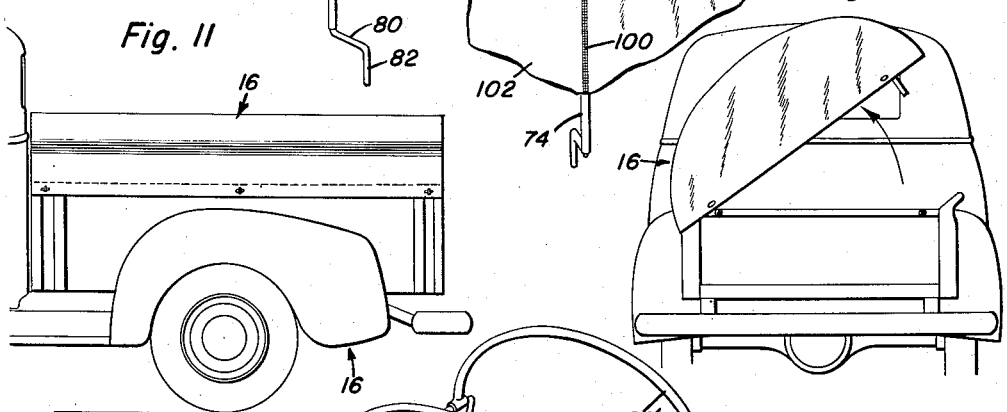
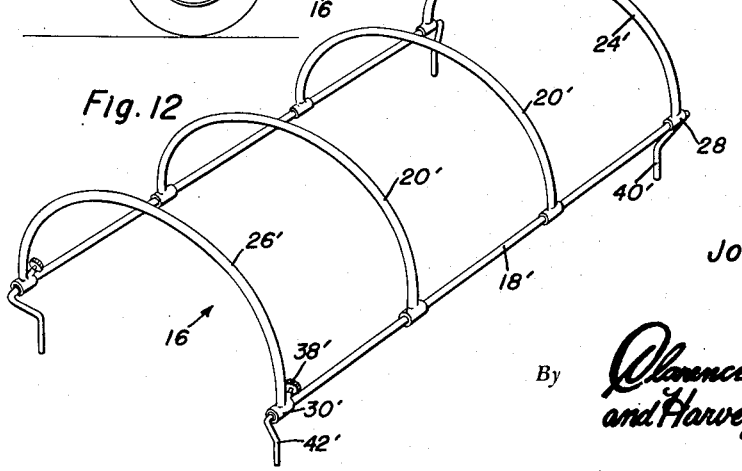
Inventor
John Cook Patented Mar. 2, 1954

2,670,988

UNITED STATES PATENT OFFICE 2,670,988

FOLDING PICKUP TRUCK TOP

John Cook, Grants Pass, Oreg.

Application August 22, 1950, Serial No. 180,755

1 Claim. (Cl. 296—105)

1

The present invention relates to improvements in pickup truck tops.

An object of the present invention is to provide a novel framework which is adapted to be removably positioned on pickup trucks and the like, wherein the frame is provided with a plurality of transversely extending bows for supporting a canvas covering.

A further object of the present invention resides in the novel arrangement of the transversely extending bows whereby they may be longitudinally moved for unfolding the top to its collapsed position when desired.

Still another object of the present invention is to provide a novel arrangement whereby the pickup truck top may readily be removed from the back end of a pickup truck or may be pivoted with respect to one side during loading of the truck.

Various other objects and advantages will become apparent from the detailed description to follow. The best forms in which I have contemplated applying my invention are clearly illustrated in the accompanying drawings, wherein:

Figure 1 is a side elevational view of a pickup truck showing one form of foldable top mounted thereon;

Figure 2 is a side elevational view of the structure of Figure 1, but showing the top in folded position;

Figure 3 is a rear elevational view of Figure 2;

Figure 4 is a top plan view of the foldable canvas top for use in conjunction with the present invention;

Figure 5 is a vertical transverse sectional view of the pickup truck top of Figure 1;

Figure 6 is a vertical longitudinal sectional view of a detail showing the connection between the transversely extending bows and the longitudinally extending side members at one end of the truck;

Figure 7 is a detail sectional view showing the sleeve of one of the transversely extending bows that is to be positioned intermediate the ends of the side members;

Figure 8 is a detail sectional view showing a sleeve connected to the transversely extending bow at the other end of the longitudinal members, with set screw means for fixedly positioning the cross bow;

Figure 9 is a side elevational view of a modified form of folding pickup truck top;

Figure 10 is a perspective view of the form of pickup truck top shown in Figure 9;

Figure 11 is a side elevational view of still

2 another form of the present invention which is similar to the form shown in Figure 1;

Figure 12 is a detail perspective view of the form of the invention disclosed in Figure 11; and Figure 13 is a rear elevational view showing the modified form of the invention of Figures 11 and 12 in partially pivoted position whereby the truck may be loaded.

Referring more particularly to the drawings, wherein like numerals designate like parts throughout, the numeral 10 designates generally a pickup truck with which the structure of the present invention may be employed. The numeral 12 designates generally a first form of folding pickup truck top, the numeral 14 designates generally the second form of folding pickup truck top, and the numeral 16 designates generally the third form of the invention.

Referring now to Figures 1 through 5, it will be seen that the structure of the first form of the present invention includes a pair of longitudinally extending side members 18 which are substantially tubular in form and open at its ends. A plurality of transversely extending and arcuated bars 20 are provided with perpendicularly positioned sleeves 22 at their extremities which are adapted to be slidingly engaged on the longitudinal side members 18. The end bows 24 and 26 of the pickup truck top 12 are substantially similar to the arcuated bows 20 but are provided with angularly extending rigidifying bars 27. Sleeves 28 and 30 are fixedly secured in perpendicular relation to the arcuated bows 24 and 26 at their extremities.

The sleeve 28 is best shown in Figure 6 as tubular in form with an annular flange 33 at one end for engagement with the extremity of the longitudinal side member 18 for preventing movement of the sleeve 28 in one direction on the side member 18. Figure 8 shows best the sleeve 30 which is adapted to be fixedly secured to each of the extremities of the arcuated bow 26. The sleeve 30 is provided with an angularly extending boss 34 which is provided with an internally threaded bore 36 for receiving the set screw 38 whereby the sleeve 30 and arcuated bow 26 may be fixedly positioned on the longitudinal side members 18.

The means for mounting the pickup truck top 12 on a truck includes the angulated mounting bars 40 and 42 which are provided with horizontally extending ends 44 and 46 for insertion into the extremities of the longitudinal side members 18 for support thereby. The other ends of the angulated mounting bars 40 and 42 are substantially vertically extending and adapted to be received within the mounting tubes 48 and 50 which are fixedly secured to the pickup truck.

It will readily be seen that when the arcuated bows 20, 24 and 26 are in the positions shown in Figure 5, a canvas top may be positioned thereon for covering the same. Figure 4 shows a form of canvas top which may be employed in conjunction with the structure of the present invention. The canvas top 52 consists of a substantially rectangular center portion 54 to which four rectangular sections 56, 58, 60 and 62 are integrally formed. The center section 54 comprises the top, section 56 and section 60 constitute side portions, and sections 58 and 62 represent the front and rear sections, respectively, of the foldable top. The front section 58 is provided with a window portion 64 which is adapted to be positioned so that a clear view may be had from the rear window of the cab. The canvas is provided with a plurality of strings 66 whereby the top may be tied to the arcuated bows of the folding truck top.

When it is desired to fold the pickup truck top 12 to the position shown in Figure 2, the set screw 38 is loosened and all of the arcuated bows 20 and 26 are slid along the longitudinal side members 18 until they reach the position shown in Figure 2.

Referring once again to Figure 4, it will be seen that the canvas top is provided with an integrally formed boot section 68 whereby, when the folding top is in the position shown in Figure 2, the boot may be wrapped therearound for holding the same in position and for providing a pleasing appearance.

Referring now to Figures 9 and 10, the modified form 14 will be described. The frame 14 comprises a pair of longitudinally extending side bars 70 and 72 which are provided with angulated ends 74 and 76. The angulated ends 74 and 76 include vertically extending portions 78 which extend downwardly from the longitudinally extending portions. The lower ends of the vertically extending portions 78 are angulated horizontally and then vertically, as at 80 and 82. The vertically extending terminal portions 82 are adapted to be received in tubes, such as are shown in Figure 5 at 48 and 50.

The frame 14 is provided with a plurality of arcuated bows 86 and end bows 84 and 88. The intermediate arcuated bows 86 are provided with sleeves 90 at their extremities for sliding movement on the longitudinally extending bars 72. The end bows 84 and 88 terminate in sleeves 92 which are somewhat similar in form to the sleeves 30 shown in Figure 8, set screw means 38' being provided. As in the first form of the invention, the arcuated bows may be longitudinally moved to the folded position if desired.

The frame 14 is provided with a special canvas top which includes a top portion 94 which merely covers the upper portion of the frame. Detachable side wall portions 96 may be secured to the top portion 94 by means of the straps 98, with zipper means 100 being provided for securing the flat portions 96 to the end portions 102.

Referring now more particularly to Figures 11 through 13, a third form 16 of the present invention will now be described. The frame 16 is substantially similar to the first form of the invention, the longitudinally extending side members 18' having angulated mounting bars 40' and 42' connected to the ends thereof for mounting in tubes on the pickup truck, such as that at 48 and 50 in Figure 5. The arcuated bows 20' are of less height than the arcuated bows 20 in the first form of the invention. The end arcuated bows 24', 26' are of arcuate form similar to the bows 20'. The end bow 26' is provided with a pair of sleeves 30' provided with a set screw 38' for positioning of the longitudinal side members 18'. As in the first form of the invention, the arcuate transverse bows may be longitudinally moved to the folded position when desired.

With the folding pickup truck top 16 as is shown in Figure 11, loading may be accomplished by merely pivoting the top on a pair of its side mounting members 40' and 42' as shown in Figure 13. After loading, the top may have its mounting bars reinserted into the mounting sleeves on the pickup truck.

From the foregoing description, taken in conjunction with the drawings, it is believed that a folding pickup truck top of various forms has been provided which will accomplish all of the objects hereinabove set forth and which is economical of manufacture, easily assembled and of relative simplicity.

Having thus described the invention, what is claimed as new is:

For use with a pickup truck, a folding top comprising a pair of longitudinally extending tubular side members, angulated mounting bars, said mounting bars including ends extending longitudinally into the extremities of said tubular side members, mounting means on the truck for receiving said bars, a front bow, cup shaped mounting members rigidly connected to the ends of said front bow for engaging the front ends of said tubular side members, said cup shaped members embracing the front ends of said tubular side members and having apertures coaxial with said tubular side members, said angulated mounting bars extending through said apertures into the extremities of said tubular side members, a plurality of intermediate bows, sleeve means fixed on said intermediate bows slidably engaging said tubular side members, a back bow, sleeves rigidly attached to said back bow for slidably engaging said tubular side members, locking means for locking said last mentioned sleeves on said tubular side members, rigidifying braces applied to said front and back bows, said braces being rigidly connected to said bows intermediate the ends thereof, the front bow braces being rigidly attached to said cup-shaped members in spaced relation to said front bows, and the back bow braces being rigidly attached to said last mentioned sleeves in spaced relation to said back bows.

JOHN COOK.

References Cited in the file of this patent

UNITED STATES PATENTS

| Number | Name | Date |
|---|---|---|
| 506,692 | Stowe | Oct. 17, 1893 |
| 849,675 | Gilleland et al. | Apr. 9, 1907 |
| 1,491,306 | Kirkham | Apr. 22, 1924 |
| 1,679,642 | Walden | Aug. 7, 1928 |
| 2,129,893 | Walden | Sept. 13, 1938 |

FOREIGN PATENTS

| Number | Country | Date |
|---|---|---|
| 217,574 | Germany | Jan. 5, 1910 |
| 303,683 | Great Britain | Jan. 10, 1929 |